US007378986B2

(12) United States Patent

Eckstein et al.

(10) Patent No.: US 7,378,986 B2

(45) Date of Patent: May 27, 2008

(54) DEVICE AND METHOD FOR RADIO-BASED DANGER WARNING

(75) Inventors: Lutz Eckstein, Stuttgart (DE); Volker Entenmann, Affalterbach (DE); Markus Hess, Baltmannsweiler (DE); Uwe Petersen, Steinenbronn (DE); Werner Reichelt, Fellbach (DE); Thomas Unselt, Stuttgart (DE); Cornelia Voigt, Aichwald (DE); Richard Zimmer, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 181 days.

(21) Appl. No.: 10/526,537

(22) PCT Filed: Aug. 22, 2003

(86) PCT No.: PCT/EP03/09332

§ 371 (c)(1), (2), (4) Date: Oct. 25, 2005

(87) PCT Pub. No.: WO2004/029901

PCT Pub. Date: Apr. 8, 2004

(65) Prior Publication Data

US 2006/0114123 A1 Jun. 1, 2006

(30) Foreign Application Priority Data

Sep. 3, 2002 (DE) ................................ 102 41 133
Jul. 17, 2003 (DE) ................................ 103 32 502

(51) Int. Cl.
*G08G 1/00* (2006.01)
*G08G 1/16* (2006.01)
*B60Q 1/00* (2006.01)

(52) U.S. Cl. ...................... 340/902; 340/903; 340/905; 340/441

(58) Field of Classification Search ................. 340/902
See application file for complete search history.

(56) References Cited

U.S. PATENT DOCUMENTS 4,694,296 A * 9/1987 Sasaki et al. ............... 340/904

(Continued)

FOREIGN PATENT DOCUMENTS

DE 25 59 184 A 12/1975

(Continued)

OTHER PUBLICATIONS

English Translation of Notification of Reasons for Refusal dated Aug. 4, 2006 (Two (2) pages).

(Continued)

*Primary Examiner*—Donnie L. Crosland
(74) *Attorney, Agent, or Firm*—Crowell & Moring LLP

(57) ABSTRACT

In a method and apparatus for radio-based issuing of warnings of hazards to the driver of a vehicle having a data receiver, the data receiver receives data from at least one data transmitter of at least one other vehicle, and evaluates the received data. The received data comprising information about the position, speed and direction of travel of the transmitting vehicle. The approach speed between the receiving vehicle and transmitting vehicle are determined in order to evaluate the received data in the receiving vehicle. According to the invention, in order to evaluate the received data in the receiving vehicle, the distance between the transmitting vehicle and the receiving vehicle is determined, and it is determined whether information is output to the driver, based on the distance between the transmitting vehicle and receiving vehicle, and based on the approach speed between the transmitting vehicle and receiving vehicle.

14 Claims, 6 Drawing Sheets

U.S. PATENT DOCUMENTS

| | | | | |
|---|---|---|---|---|
| 5,424,726 | A * | 6/1995 | Beymer | 340/902 |
| 5,805,103 | A * | 9/1998 | Doi et al. | 342/70 |
| 6,067,031 | A * | 5/2000 | Janky et al. | 340/903 |
| 6,236,337 | B1 * | 5/2001 | Beier et al. | 340/905 |
| 6,442,485 | B2 | 8/2002 | Evans | |

FOREIGN PATENT DOCUMENTS

| | | | |
|---|---|---|---|
| DE | 43 12 595 | A1 | 4/1993 |
| DE | 198 03 345 | C2 | 1/1998 |
| DE | 198 43 564 | A1 | 9/1998 |
| DE | 199 52 392 | A1 | 10/1999 |
| DE | 102 41 133 | A1 | 3/2004 |
| EP | 0 927 983 | A2 | 7/1999 |
| FR | 2 793 056 | | 4/1999 |
| GB | 2 349 000 | A | 4/1999 |
| JP | 7-286858 | A | 10/1995 |
| JP | 9-190596 | A | 7/1997 |
| JP | 10-198876 | A | 7/1998 |
| JP | 2000-242898 | A | 9/2000 |
| JP | 2001-093097 | A | 4/2001 |
| WO | WO 00/17016 | | 3/2000 |
| WO | WO 01/61668 | A1 | 8/2001 |

OTHER PUBLICATIONS

Warn—ein neues funkbaslertes Gefahrenwarnsystem im Kfz Fuer mehr Sicherheit im Strassenverkehr (Warn—a new radio based vehicle alert system to improve traffic safety); Dipl.-Ing. Ch. Brenzel et al; VDI Berichte Nr. 1415, 1998, pp. 967-982.

Dokumentation Kraftfahrwesen e.V. (Docment "Wireless Vehicle to . . . "; Christian Passmann et al; Robert Bosch GmbH; 2001-01-1307; pp. 149-154.

Japanese Office Action dated Feb. 26, 2007 with English translation (four (4) pages).

* cited by examiner

DEVICE AND METHOD FOR RADIO-BASED DANGER WARNING

CROSS-REFERENCE TO RELATED APPLICATIONS

This application is related to application Ser. No. 10/526,551, filed Mar. 3, 2005, which has 371 (c) entry date of May 11, 2006 and assigned to the same assignee.

BACKGROUND AND SUMMARY OF THE INVENTION

This application claims the priority of German patent documents 102 41 133.6, filed Sep. 3, 2002 and 103 32 502.6, filed Jul. 17, 2003 (PCT International Application No. PCT/EP2003/009332, filed Aug. 22, 2003), the disclosures of which are expressly incorporated by reference herein.

The invention relates to a radio-based device for issuing hazard warnings to the operator of a vehicle.

European patent document EP 927 983 A2 discloses a radio based hazard warnings device, in which, in a vehicle that receives a hazard warning, the difference between the speed of a transmitting vehicle and the receiving vehicle is determined, and on the basis of the determined difference in speed a decision is made as to whether a warning signal is output to the driver.

French patent document FR 2 793 056 discloses a device for issuing hazard warnings, in which the type of hazard is indicated in the vehicle. In the receiving vehicle it is determined whether it is necessary to output the warning to other vehicles.

International patent document WO 01/61668 A1 discloses a hazard warning device, in which a warning zone is generated in the transmitting vehicle and is output together with the hazard warning. In the transmitting vehicle, the position of the vehicle and the type of road on which the vehicle is located are determined using a navigation system. The difference between the speed of the transmitting vehicle and the typical or maximum speed of other vehicles on the given type of road is included in the calculation of the warning zone in the transmitting vehicle. The received hazard warning is evaluated in the receiving vehicle using a navigation system, by checking whether the receiving vehicle is in the warning zone and whether the hazard warning relates to a section of road which possibly lies in front of the receiving vehicle.

In the publication "WARN—ein neues funkbasiertes Gefahrenwarnsystem im Kfz für mehr Sicherheit im Straβenverkehr [WARN—a new radio-based hazard warning system in motor vehicles for providing more safety in road traffic]", Brenzel, C., Hickel, F., Paβmann, C., VDI Berichte [VDI Reports] No. 1415, 1998, the type of hazard, the speed of the transmitting vehicle and information about the position of the transmitting vehicle are to be transmitted, together with the hazard warning. In the receiving vehicle, the difference in speed relative to the transmitting vehicle is determined, and information about the position of vehicles is used to determine whether the warning message has been generated by a vehicle traveling in front, by a vehicle traveling behind, or by the oncoming traffic.

In the document "Wireless Vehicle to Vehicle Warning System", Paβmann, C., Brenzel, C., Meschenmoser R., SAE Paper, 2000-01-1307, icons which symbolize the type of hazard are displayed in the receiving vehicle. In addition, the distance from the location of the hazard is indicated in the receiving vehicle.

German patent document DE 199 52 392 A1 discloses a method in which warning information that is dependent on the route is made available to the driver. Digital road maps are used to detect, for example, whether the driver is approaching a curve. If so, and if the current speed of the vehicle is higher than a speed limit for the curve, the driver is first warned visually. If he or she does not react to the visual warning within a certain time (i.e., if he or she continues to drive with undiminished speed), an additional audible warning is issued. Since the curve has a fixed position, the approach to it is always detected at a sufficiently large distance ahead, and various warning stages of increasing urgency are successively triggered.

One object of the invention is to provide an improved method and apparatus for issuing hazard warnings, including an improved manner of outputting information to the driver.

This and other objects and advantages are achieved by the radio based hazard warning device which generates a hazard warning that extends beyond the visual range of a hazard warning system, thereby extending the range of the classic hazard warning system. A significant component of the device is a radio modem which permits direct exchange of data between vehicles in real time, with a sufficiently large range of approximately 1 km. In addition, the device may also include a locating module with which the position of the vehicle can be determined by locating means. The locating module may be a component of (or connection to) a navigation system, so that the position of the vehicle can be determined with even greater accuracy because the measured position of the vehicle can be represented on the digital map of the navigation system by map matching. As a result, errors in the determination of a position can be compensated by the locating module.

The data which are received by the transmitting vehicle include information regarding the position of the transmitting vehicle, determined by a locating device and/or a directional course of the vehicle. A directional course of the vehicle is formed from the direction of travel and speed of the vehicle at various times. The received information relating to the position may also include additional information about earlier positions of the transmitting vehicle, forming a position chain of the vehicle which is composed of a sequence of points at which information relating to the position of the vehicle is present. In this context the position chain can be a directional course and/or a sequence of positions which are determined by means of a locating system or navigation system.

In one advantageous embodiment of the invention, a relevance measure is determined from the received data of the transmitting vehicle and the position, speed and direction of travel data of the receiving vehicle. The relevance measure expresses the probability that the transmitting vehicle is located on the part of a route lying in front (that is, upstream) of the receiver. The receiving vehicle advantageously has information about the route which is used to estimate in advance its future route. The relevance measure (which expresses the probability that the transmitting vehicle is located on the predicted future route of the receiving vehicle) is advantageously determined from the received data of the transmitting vehicle and the predicted future route of the receiving vehicle.

In another advantageous embodiment of the invention, incorrect warnings are detected by reference to a time profile of the relevance measure. This means, for example, that information whose relevance measure is too low is not output.

In still another advantageous embodiment of the invention, the outputting of information to the driver is terminated as soon as a warning is determined to be incorrect. In this context, it is advantageous if, as soon as the outputting of information is terminated due to an incorrect warning, the driver is explicitly informed, by means of a directly following information output, that the previously reported hazard is no longer relevant to him.

The decision as to whether information is output to the driver is taken during the evaluation of a received radio message in a computer unit in the receiving vehicle. The basic idea of the triggering concept is that the decision as to whether information is output to the driver includes at least the approach speed between the transmitting and receiving vehicle and the distance between the two vehicles. As a result, the invention allows for the fact that for the urgency level of a warning, it is particularly decisive how much time remains for the driver to react to the warning and brake his vehicle. This time is however calculated at least from the distance and the relative speed between the receiver and transmitter so that both variables are decisive for the triggering concept (that is, the decision as to when information is output and the decision as to when the outputting is terminated).

By linking the distance to the approach speed, the time which remains until the transmitter is reached becomes the determining variable for triggering. This also corresponds to the human perception of hazards in road traffic. The driver evaluates the degree of danger of a situation mainly according to the time which remains to carry out necessary actions and driving maneuvers in order to avoid an accident.

A warning is not triggered if the distance from the transmitter is so long or the approach speed so low that there is initially no need for action on the part of the driver. Likewise, the triggering can, if desired, be adapted in such a way that triggering of a warning is dispensed with if the distance is so short or the approach speed so high that the driver would no longer be able to react appropriately to the warning before reaching the transmitter as a result of the short prewarning time.

In an embodiment of the invention, an urgency level for outputting information is determined using the distance between the transmitting vehicle and receiving vehicle, as well as the approach speed of the transmitting vehicle and receiving vehicles.

In another advantageous embodiment of the invention, the manner of outputting information to the driver depends on the determined urgency level, based on the distance and the relative speed between the receiver and transmitter.

How and when the driver is informed about a received radio message depends on the urgency level. This is advantageous in particular for the high speeds at which vehicles travel on highways, at which the driver must concentrate entirely on the task of driving and is capable only to a limited degree of absorbing information and warnings which are output by a vehicle system. The driver can intuitively understand the warnings and react to them correctly.

The invention helps to prevent, for example, mass vehicle pileups which can occur on motorways, frequently due to poor visibility conditions (for example fog), on sections of a route with poor visibility (for example before a curve which cannot be seen into satisfactorily) or traffic disruption (for example the end of congestion or roadworks). The radio based hazard warning device according to the invention makes it possible for the drivers of following vehicles to detect the hazard ahead in sufficient time to be able to brake their vehicle and avoid the hazard. In one embodiment of the invention, the vehicle can be braked automatically by an intervention in vehicle control systems.

In addition to the distance and the approach speed of the receiver and transmitter, a further embodiment of the invention takes into account additional data in order to decide to trigger a warning, as well as its urgency level. Examples of such data are the speed and acceleration of the receiving vehicle and the time which has passed since the last warning. Information about routes (determined, for example, by means of a digital roadmap) can also be used to determine the urgency level.

It is thus advantageous to trigger a warning only if the receiver is driving sufficiently fast, since at low speeds timely visual detection of the hazard by the driver is ensured, and an additional warning by the system is thus unnecessary.

By reference to the current acceleration of the vehicle, it is possible to check whether the driver of the receiver is already braking hard enough to avoid a rear end collision with the transmitter. If so, a warning can also be dispensed with.

Finally, the urgency of a warning can also be defined as a function of the time which has passed since the last warning. If two warnings follow one another in rapid succession, it is reasonable to assume that the driver is still traveling with increased alertness due to the first warning. For this reason, a low urgency level can also be assigned to the second warning if the transmitter will be reached within a short time.

In an advantageous embodiment of the invention, the radio based hazard warning device comprises a data transmitter which is triggered, for example, by the hazard warning system of the vehicle. If the hazard warning system is triggered, a corresponding radio message is emitted to all the vehicles in the vicinity of the transmitting vehicle. The transmitted data of each transmitter includes its current speed, its position chain and a type of hazard. In one embodiment of the invention it is also possible for the transmitter to transmit its identification number.

In another advantageous embodiment, information about the degree of urgency is output by a voice output means, and/or by means of a single time voice output.

Using an indicating/display method, one of a plurality of predefined indicating display modes, which includes at least a voice output and a further type of indication, are selected as a function of the urgency.

Issuing different voice outputs in order to distinguish between different urgency levels combined with an additional type of indication (for example, a visual display and/or a haptic indication) has the advantage that the corresponding voice output already contains the important information without requiring that the driver interrogate a further information source for this purpose (for example, without the driver's having to read a display unit for presenting a visual display). The additional visual display serves only as a visual information store which the driver can access when necessary in order to refresh the information. As a result, distraction is minimized and the comprehensibility of the warnings and the acceptance of the system are increased.

According to an advantageous embodiment of the invention, the voice output for a first urgency level, which is determined with a low degree of urgency, can contain information which indicates the approximate distance from the source of the hazard. Such information informs the driver that he still has sufficient time to reduce his or her speed by releasing the accelerator and possibly braking slightly.

When a second urgency level with a high degree of urgency is determined, a warning indication can be output which signals to the driver that a rapid reaction is necessary, and that he or she must implement a braking deceleration process which may lie outside the normal range of driving comfort.

At both urgency levels, the voice output is carried out for the purpose of keeping the distracting effect as low as possible. The different degrees of urgency are conveyed by the various contents and formulations of the voice output.

In an alternative embodiment of the invention, at least one of the indicating display modes can comprise a single time voice output which warns of the hazard and contains information about the degree of urgency which has been determined. The distraction of the driver is reduced further by the fact that the voice output occurs only once.

In addition to information about the degree of urgency of the hazard warning it is also possible, for example, to use a visual display and/or the voice output to indicate information about a type of hazard for the two urgency levels.

In order to determine the urgency, for example external data are received from other vehicles or from a control center and evaluated. Alternatively or additionally it is also possible to evaluate data from vehicle sensors which can also comprise a locating system with a digital map and/or a navigation system.

In order to carry out the indicating/display method, the indicating/display device according to the invention comprises a control/evaluation unit, a voice output unit with a specific functionality and a further indicating/display unit.

In addition, it is possible to provide a data receiver and/or a sensor unit at the vehicle end which, for example, provide the control/evaluation unit with data for determining the urgency and/or the distance from the location of the hazard. External data, for example from other vehicles or from a control center, can also be evaluated by the data receiver.

Other objects, advantages and novel features of the present invention will become apparent from the following detailed description of the invention when considered in conjunction with the accompanying drawings.

DETAILED DESCRIPTION OF THE DRAWINGS

In the figures, identical reference symbols are used for corresponding elements.

Figure 1:
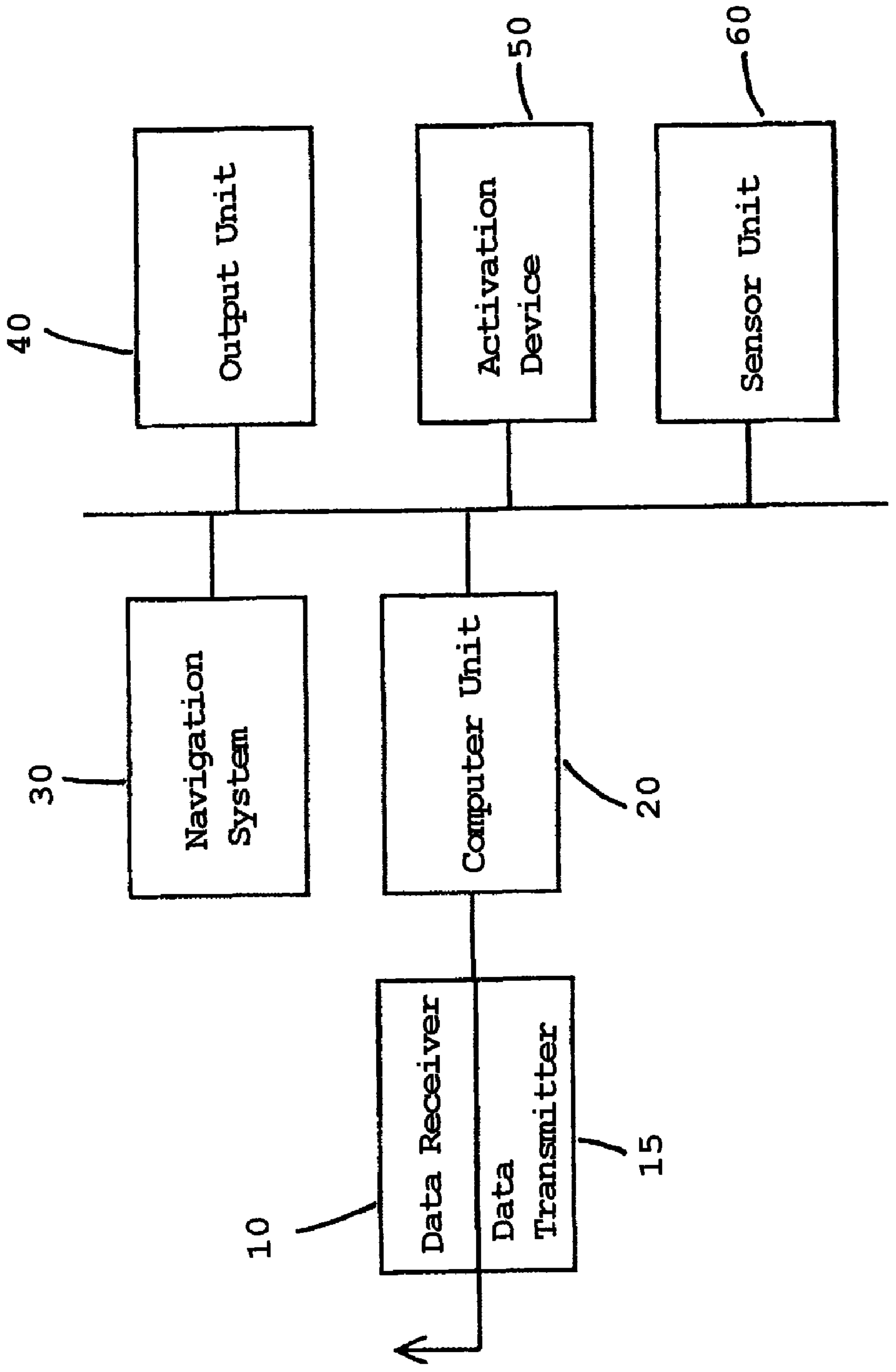
FIG. 1 is a block diagram of a radio based hazard warning device according to the invention.

As shown in FIG. 1, the radio based hazard warning device according to the invention comprises a data receiver 10, data transmitter 15 and a computer unit 20. The latter are preferably connected to a navigation system 30, an output unit 40, an activation device 50 and a sensor unit 60, via a vehicle bus system. The sensor unit may comprise a plurality of different sensors, such as a crash sensor, a speed sensor etc. The activation device 50 may be, for example, the hazard warning system of the vehicle.

Figure 2:
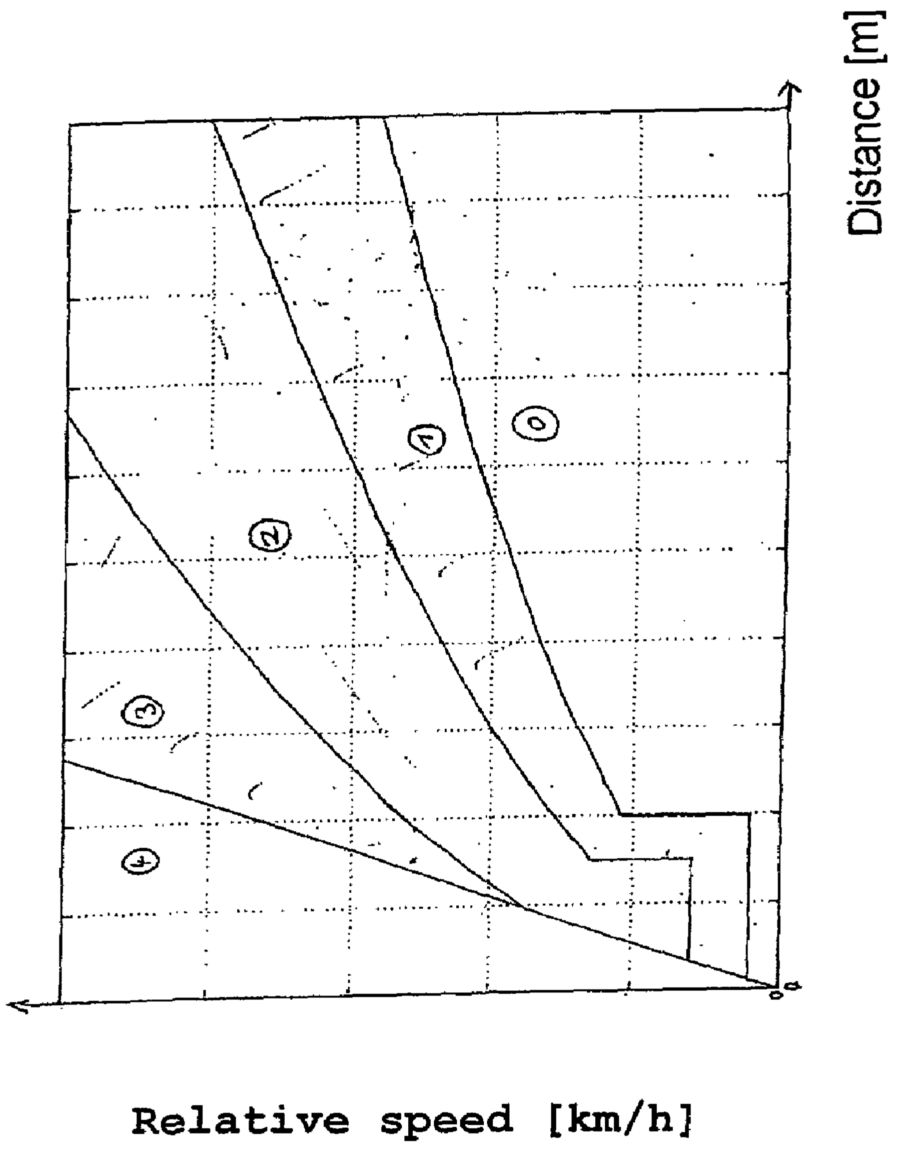
FIG. 2 is a diagram of urgency levels.

When a radio message is first received, the urgency level of a warning is determined during the processing of the radio message in the computer 20. It is possible for there to be one or more urgency levels. The value pairs of the distance and approach speed which are associated with a specific urgency level can be described, for example, by the reaction time which is permitted to the driver and the braking deceleration with which he or she must brake his vehicle in order to prevent a rear end collision with a transmitter that is located between common upper and lower threshold values. In this context, the shorter the reaction time and the greater the braking deceleration, the higher the urgency level. Urgency levels 0, 1, 2, 3, 4 are shown schematically in a diagram in FIG. 2 by way of example.

A warning is triggered only if the approach speed is sufficiently high. For example, if the transmitter and receiver are traveling with approximately the same speed and with a constant distance between them, or if the transmitter is actually moving away from the receiver, the transmitter no longer constitutes a hazard for the receiver traveling behind and it is possible to dispense with a warning. This corresponds to the urgency level 0 in the diagram in FIG. 2.

Once an urgency level has been defined, it is maintained as long as further radio messages of the same transmitter are received. The urgency level of the warning is therefore not increased as the vehicle approaches the location of the hazard even if the driver does not reduce his speed, primarily because the specific risk which originates from the transmitting vehicle or which it indicates is not known. For example, it makes a large difference whether the transmitting vehicle is located on or next to the roadway. However, this information is not necessarily available. Therefore, the driver is much more capable than the radio warning system of drawing conclusions about the dangerousness of the situation by observing the surrounding traffic situation. If the driver does not detect any hazard for him and his vehicle, he will continue to travel at virtually an unchanged speed despite the warning. However, from this behavior it is not possible to conclude that the driver has not perceived the warning.

Furthermore, with a radio warning system the time at which a radio message is received by a vehicle traveling in front cannot be predicted, and the distance from this vehicle is also known only when the first radio message is received. For this reason the receiver may already be near to the transmitter when a radio message is first received and there is not much time available. The time may in particular be too short to be able to run through successively a plurality of warning levels of rising urgency.

The hazard warning device according to the invention is mainly intended to cause the driver, by means of the warning, to continue his journey with increased attentiveness and to observe the surrounding traffic situation, since the dangerousness of a situation is, under certain circumstances, only insufficiently apparent from the hazard message received. If the driver does not detect the hazard which is specific to him, he will continue to drive at virtually an unchanged speed despite the warning. This behavior then does not require a second, more urgent warning from the device for issuing warnings of hazards.

The driver is advantageously warned as long as radio messages are received and the transmitter is located ahead of the receiver. However, it is necessary to take into account the fact that temporary disruption of the communication link may occur as a result of external influences. For this reason, with the device described here if further radio messages are not received, this situation is initially interpreted as a temporary interruption in the communication link and not as a deactivation of the transmitter. The warning is maintained and the relative movement of the receiver with respect to the transmitter is continued on the assumption that the transmitter continues moving at its last known speed. The warning is terminated only if no more radio messages are received for a sufficiently long time, but at the earliest after a minimum warning time, which ensures that the driver can also perceive the indicated warning.

A warning is also terminated if the driver of the receiver indicates, by switching on his own hazard warning system, that he has detected the signaled hazard. The switching-on of the hazard warning system, and not the state "hazard warning lights on" is advantageously used as a criterion for the termination of the warning since otherwise the driver would not receive any warning if he were to approach a transmitter with his hazard warning system already switched on because, for example, he is towing another vehicle. The possibility of switching on his own hazard warning system is an advantageous way for the driver to acknowledge a warning and thus terminate it manually. This type of acknowledgement keeps the system simple; however, more wide ranging operating control actions are possible.

A warning is also terminated automatically if the approach speed of the receiver to the transmitter or the absolute speed of the receiver become very low. This prevents, for example, a display in the vehicle from being blocked for an unnecessarily long time.

Situations may occur (for example when a vehicle is approaching the end of a traffic jam) in which a plurality of transmitters emit radio messages simultaneously.

With the system described here, the radio messages of any desired number of transmitters can be processed in parallel. Successive radio messages from the same transmitter are recognized on the basis of their common identification number. At first, individual checking is carried out for each transmitter to determine whether a warning has to be output, and which urgency level is to be assigned to it. The urgency level and the type of hazard are then defined independently of one another for the particular warning which is to be output to the driver.

In terms of the types of hazard, a distinction is made between a general hazard, a virtual warning triangle, an accident and roadworks. A general hazard warning is transmitted if the driver has manually triggered the hazard warning system and the engine of the vehicle is running (for example when approaching the end of a traffic jam). The virtual warning triangle is transmitted if the driver has triggered the hazard warning system manually and the engine of the vehicle is off (for example because the vehicle has broken down). The accident type of hazard warning is transmitted if the hazard warning system has been triggered automatically by the crash sensor of the vehicle. And finally the roadworks type of hazard is not transmitted by vehicles but rather by beacons which mark the start of roadworks.

The urgency level which is the highest of all of the levels determined from the received data is used for the warning to be output to the driver. If the radio messages from different transmitters relate to different types of hazard, they are prioritized. For example, the "accident" type of hazard receives the highest priority. The priority sequence then runs in descending order, for example from "accident" to "general hazard", "virtual warning triangle" and "roadworks". For the warning which is to be output to the driver, the type of hazard with the highest priority is selected from all the hazards present.

The manner in which a single warning is generated from various radio messages will be explained by way of an example: An accident has occurred at a distance of 800 m ahead of the receiving vehicle. The crash sensor of a vehicle involved in the accident has been triggered and has, for its part, automatically activated the hazard warning system, and thus the transmitting function of the radio warning system, which transmits the accident type of hazard. A traffic jam forms before the location of the accident. The driver of a vehicle traveling behind, which is 500 m from the receiver and travels toward the end of the traffic jam, triggers the hazard warning system manually. This vehicle therefore transmits the general hazard type of hazard. The urgency level of the warning for both transmitters is then determined in the receiving vehicle. Since the distance from the vehicle which is traveling toward the end of the traffic jam is very much shorter, its warning is assigned a higher urgency level than the warning of the vehicle involved in the accident. At the same time, the accident type of hazard has priority over the general hazard type of hazard. Accordingly, the warning about an accident is issued to the driver with a high urgency level, as a result of which the actual hazard situation is appropriately described.

The position information which is output by a transmitting vehicle advantageously comprises a directional course of the vehicle, formed from the direction of travel and speed of the vehicle at various times. Information about the position may also be generated by a navigation system 30, advantageously using a locating device, such as a GPS. The type of road and the direction of travel can also be determined using a navigation system 30. An example of the determination of the position, type of road and direction of travel by means of a navigation system 30 is described in International patent document WO 01/61668 A1, the disclosure of which is incorporated by reference, as fully as if set forth in its entirety herein. An example of the determination of the position, type of road and direction of travel using directional courses of vehicles is described in European patent document EP 0 927 983 A2, which is also incorporated herein by reference.

A position chain of a vehicle is composed of a sequence of points at which information relating to the position of the vehicle is generated. The position chain may be a directional course and/or a sequence of positions which are determined by means of a locating system or navigation system 30. The position chain describes the geometry of the section of the route covered by the transmitting vehicle (the "transmitter") in the recent past. By comparing its own position chain with the position chain of the transmitter, the receiving vehicle ("the receiver") can check whether the sections of the route covered theretofore by both vehicles are identical, and whether the transmitter is ahead of the receiver (downstream of it), or behind it (upstream of it). The result of this comparison is expressed by a relevance measure. For example, on freeways it is possible to detect whether the transmitter is located on the same roadway ahead of the receiver or on the opposite roadway. If the transmitter is located ahead of the receiver on the same roadway, the relevance measure is large and the driver of the receiver must be warned about the signaled hazard. If the transmitter is located behind the receiver or on the opposite roadway, the relevance measure is small and the received hazard message has no significance for the driver of the receiver.

A further advantage of the triggering concept described here is the ability to detect incorrect warnings, (that is, a warning regarding a hazard which is not located on the driver's future route). There are certain situations in which an incorrect warning is unavoidable. If, for example, the transmitter is located just beyond a fork in the roadway (for example on the left hand branch), the driver of the receiver must be warned of the signaled hazard even if at the time when the warning is triggered it is not yet known whether the receiver will travel on the left-hand or right-hand branch of the fork. Irrespective of the future decision to make a turn, the relevance measure of the transmitter is sufficiently large to trigger a warning.

However, after the fork is reached the further course of the relevance measure depends on whether the receiver travels along the left-hand or right-hand branch of the fork. In the first case, the position chains of the transmitter and receiver continue to correspond satisfactorily, the relevance measure remains high and the warning is maintained. In the second case, the position chains of the transmitter and receiver diverge and the relevance measure drops. If it drops below a given threshold value, it can be assumed that the transmitter and receiver are then located on different routes, and the warning has been incorrectly triggered. An incorrect message is therefore detected by the trailing edge of the relevance measure. In this case, not only is the warning terminated but the driver is also explicitly informed that the previously signaled hazard is no longer relevant to him. This prevents the driver's losing confidence in the radio warning system due to incorrect warnings which are unavoidable under certain circumstances. It also prevents the driver's being surprised by the apparently inexplicable disappearance of the warning.

The triggering criteria can also be refined by route information which can be obtained, for example, from a digital road map. On the one hand, it is possible to use the route information to predict the future route of the transmitter, at least as far as the next intersection point. As a result, the position chain of the transmitter can be lengthened and the reliability of the relevance measure, which depends on the length of overlap between the position chains of the transmitter and receiver, can be increased.

Furthermore, by previewing routes it is possible to determine the distance between the transmitter and receiver more accurately because the precise geometry of the part of the route lying between the two vehicles is known. Likewise, incorrect warnings can in certain situations be avoided by means of the route information. If, for example, it is detected that a transmitter is located before a fork, then only warning levels of high urgency can be permitted, ensuring that the distance threshold for the triggering of the warning is located before the fork so that it is possible to wait to see whether after the fork the receiver will travel on the same branch as the transmitter or select the other alternative route.

Advantageously, the triggering concept can be supplemented by an output concept, which determines how the driver is warned. In this context, there is a close connection between the urgency level of a warning, which is defined by the triggering concept, and the type of output. The driver can be informed visually and/or audibly about the hazard lying ahead.

Visual outputting is performed by a display 70 which is mounted in the vehicle (preferably integrated into the combination instrument) and is located in the primary field of vision of the driver. In this location, the driver's attention can be advantageously diverted to the hazard warning using a visual output. The display surface of the display is divided here into various areas 80, 90, 100, 110, 120 (FIGS. 3 and 4) which can be activated individually, and various information items can be conveyed to the driver and activated or removed from the screen as a function of the urgency level.

Figure 3:
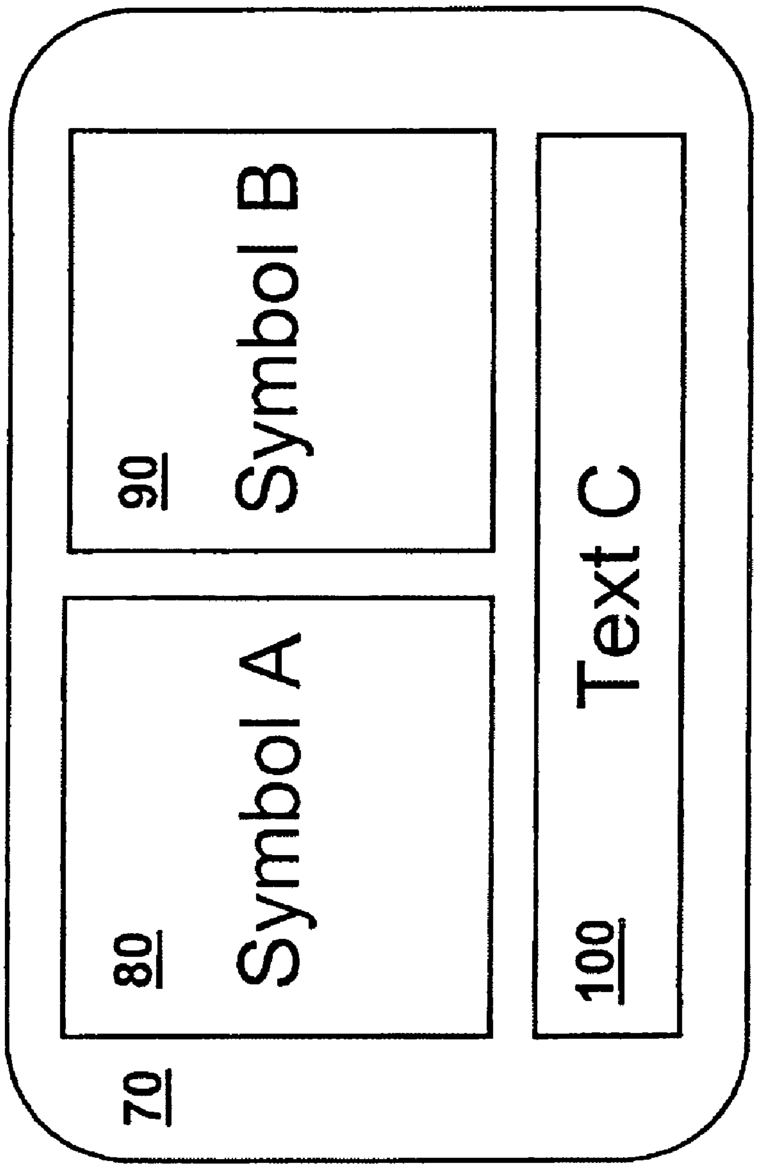
FIG. 3 is an example of an information output.

For example the display configuration in FIG. 3 is used for warnings which are assigned to a low urgency level, such as the urgency level 1. Symbol A in area 80 is a warning symbol which signals to the driver that he or she should drive with increased attentiveness and caution. This symbol may be the same for all types of hazard. However, it is also possible to use symbols which are specific to types of hazards. Symbol B in area 90 signals to the driver that the hazard warning has been transmitted by a vehicle traveling in front. This information is important to make clear to the driver that the hazard has not been detected independently in his own vehicle, and that he can therefore also not assume that he is being warned of every comparable hazard. Text C in area 100 informs the driver additionally about the type of hazard lying ahead, for example an accident.

Figure 4:
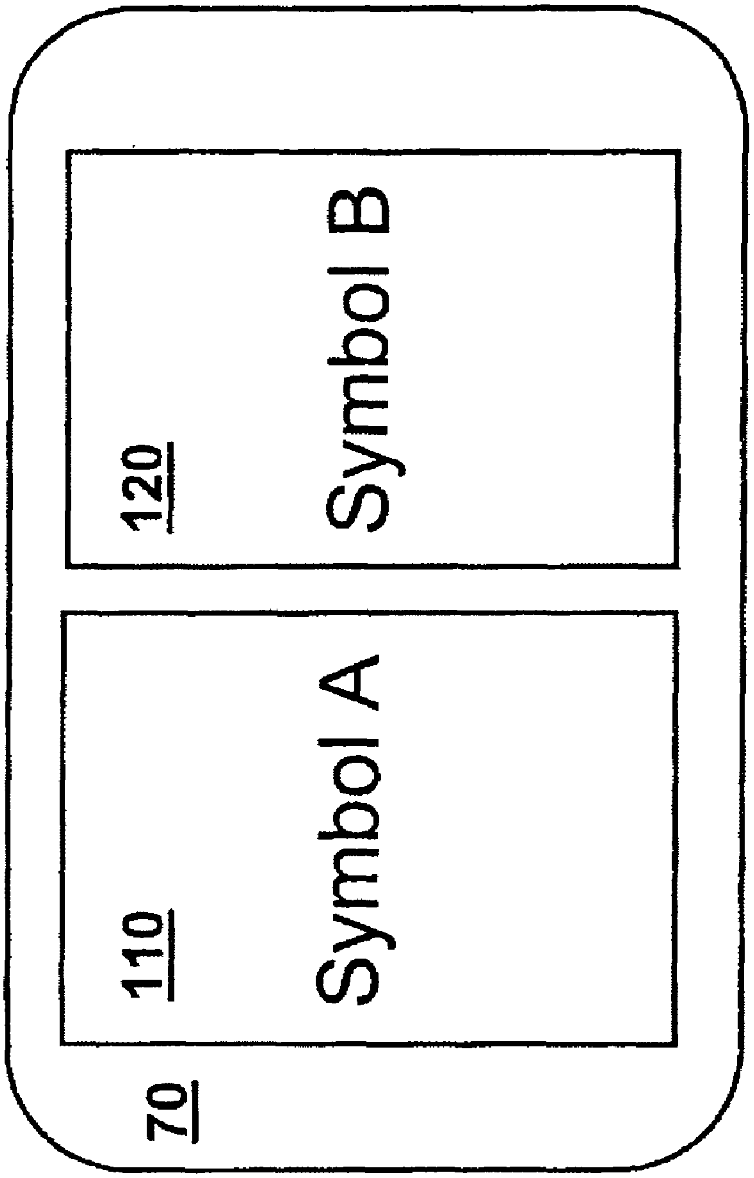
FIG. 4 is a further example of an information output.

The display configuration illustrated in FIG. 4 is used for warnings which are assigned to a higher urgency level. The symbols A and B are displayed again, but the two display areas 110, 120 which are provided for the symbols completely fill the display surface and no text is output. As a result of the larger symbols the driver's attention can be diverted even more quickly to the display or the warning. (Under certain circumstances, for example in the case of urgent warnings, there may not be time to read text information in the short time until the transmitter is reached.)

In a further embodiment of the output concept, the symbols from FIG. 3 or FIG. 4 can also flash together or independently for a certain time after the triggering of a warning so that the driver recognizes the visual warning even more quickly and can distinguish it better from other icons on the display.

The visual warnings can also be supplemented by audible signals or voice outputs in order to ensure that the warning is reliably perceived even if the driver's gaze is averted from the combination instrument because he or she is, for example, operating the radio or some other device mounted in the center console, or is concentrating completely on observing the surrounding traffic situation. In this case, various acoustic signals can again be assigned to different urgency levels so that the driver can immediately recognize their urgency from the audible warning.

With this output concept it is possible to dispense with directly outputting the distance from the transmitter. As a rule, the position measurements between the transmitter and receiver are subject to errors and the precise geometry of the section of road lying between the two vehicles may not be known. Finally, it has also been found that drivers sometimes incorrectly estimate numerically stated distances, which places in question the benefit of numerical distance information.

With the described output concept there is instead a close intuitive relationship between the type of visual and audible output and the chronological proximity from the transmitter or the necessary reaction by the driver. This ensures that the driver can react quickly and intuitively to the warning and the driver's reaction is not delayed by the laborious absorption of textual and numerical information which can have a highly distracting effect.

Figure 5:
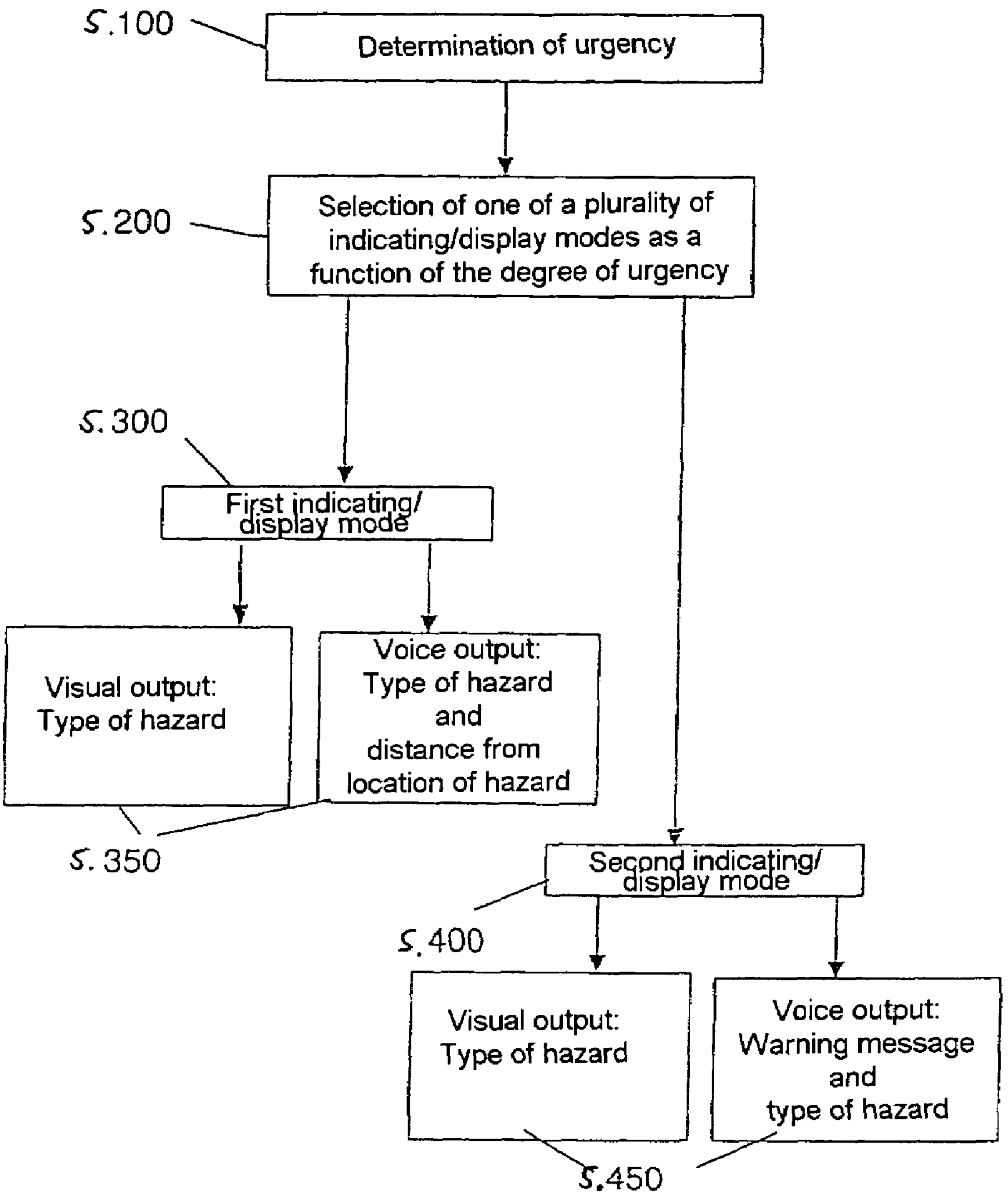
FIG. 5 is a flowchart of a method for issuing warnings of hazards in a motor vehicle.
Figure 6:
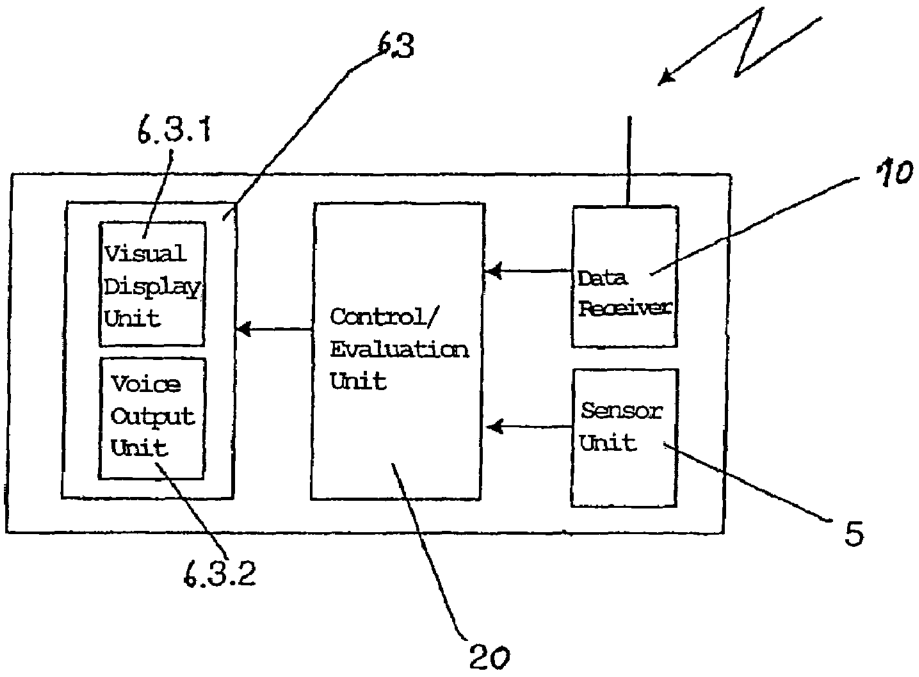
FIG. 6 is a schematic block diagram of an indicating/display device for issuing warnings of hazards in a motor vehicle.

A further advantageous embodiment of the indicating/display concept, which includes an indicating/display method and an indicating/display device is presented in FIGS. 5 and 6.

With the indicating/display method in FIG. 5, a degree of urgency of a hazard warning which is to be indicated is determined in a first step 5.100. Subsequently, in step 5.200, one of a plurality of indicating/display modes is selected as a function of the degree of urgency which is determined.

When a first urgency level with a low degree of urgency is determined, a first indicating/display mode (step 5.300) is selected and a single time voice output and a further type of indication or display, which warn of the hazard, are then activated in step 5.350, with only the voice output containing information about the degree of urgency. The other type of indication or display is, for example, a visual display and/or haptic indication. In the exemplary embodiment illustrated, an additional visual display is activated and the low degree of urgency is represented by the single time voice output of the distance from the location of the hazard.

When a second urgency level with a high degree of urgency (i.e., one which is higher than the low degree of urgency), is determined, a second indicating/display mode (step 5.400) is selected and a single time voice output and a further type of indication or display in the form of a visual display, which warn of the hazard, are then activated in step 5.450, with only the voice output containing information about the degree of urgency. In the illustrated representative embodiment, the high degree of urgency is indicated by the single time voice output of a warning message.

In the case of the first urgency level and the associated selected first indicating/display mode, the driver is informed once by voice about the type of hazard and the distance from the location of the hazard, for example "traffic jam in 700 meters" or "accident in 600 meters". The visual display comprises a warning symbol with an additional text which also describes the hazard, for example "traffic jam" or "accident". The first urgency level thus has a more informative character. It is important that the distance information is provided only once by means of the voice output and is not displayed visually.

This approach is based on the recognition that on the one hand car drivers are accustomed, from their everyday experience, to handling specific distance information, for example as a result of distance information on road signs, but on the other hand their ability to estimate distances is only poor. Because the voice output includes the accustomed (and therefore also expected) distance information, acceptance of the indicating method increases. The driver has the impression of having obtained all the relevant information. At the same time, the audible distance information which is given only once ensures that the driver is only given a qualitative impression of the distance from the location of the hazard. This property is important, since the exact distance from the location of the hazard is generally impossible to determine and the driver can therefore not rely on the distance information. For this reason the system here avoids updating the distance information audibly or continuously displaying it on a display.

At the second urgency level, and in the associated selected second indicating/display mode, the driver is directly requested by the voice output of a warning message to be careful and to drive with a high level of attentiveness. In addition, he or she is informed about the type of hazard. Examples of the warning message when the second urgency level is output by voice are "Caution, traffic jam" or "Caution, accident". The use of the term "Caution" signals to the driver that he must react immediately to the warning, for example by braking quickly and hard, if appropriate even beyond a customary range of driving comfort since the hazard is located directly in front of him. There is no longer any voice output of distance information. The spatial, and above all chronological proximity of the event is described by the warning message "Caution". In the case of the second urgency level there is also a visual display which, in the embodiment illustrated, is identical to that from the first urgency level. This makes it clear that the voice output is the primary information medium via which the degree of urgency of a hazard warning is conveyed. The visual display is only to be seen as an addition.

In order to determine the urgency in the exemplary embodiment illustrated, data are evaluated by a data receiver and/or by a sensor unit with a locating unit that includes a digital map, and a navigation system.

As is apparent from FIG. 6, the indicating/display device which is shown there for issuing warnings of hazards in a motor vehicle comprises a control/evaluation unit 20 for determining a degree of chronological urgency of the hazard warning to be issued and for selecting one of a plurality of predefined indicating/display modes as a function of the degree of urgency which is determined. An indicating/display device 6.3 indicates the hazard warning with the selected indicating/display mode. The indicating/display device 6.3 comprises a visual display unit 6.3.1 and a voice output unit 6.3.2 which give a warning of the hazard in at least one indicating/display mode, with only the voice output unit 6.3.2 outputting information about the degree of urgency.

If the control/evaluation unit 20 determines a first chronological urgency level with a low degree of urgency, the visual display unit 6.3.1 and the voice output unit 6.3.2 output an indication about the type of hazard, for example "traffic jam" or "accident". The voice output unit 6.3.2 additionally outputs distance information which corresponds to the approximate distance of the vehicle from the location of the hazard.

If the control/evaluation unit 20 determines a second chronological urgency level with a high degree of urgency, the visual display unit 6.3.1 and the voice output unit 6.3.2 again output the indication about the type of hazard. The voice output unit 6.3.2 additionally issues a warning message which signals that an immediate reaction is necessary.

In order to determine the urgency, the control/evaluation unit 20 evaluates external data which is received by a data receiver 10 from other vehicles and/or from a control center. Alternatively or additionally, data can be evaluated by a sensor unit 5 at the vehicle end, which sensor unit 5 comprises, for example, sensors of driver assistance systems and/or of a locating unit with a digital map and/or a navigation system 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A radio-based device for issuing hazard warning information to a driver of a receiving vehicle having a data receiver which receives hazard data from a data transmitter of at least one other vehicle, and evaluates the received data; wherein:

the received data include information regarding position, speed and direction of travel of the at least one other vehicle;

an approach speed between the receiving vehicle and the at least one other vehicle is determined in order to evaluate the received data in the receiving vehicle;

in evaluating the received data in the receiving vehicle, distance between the at least one other vehicle and the receiving vehicle is determined; and whether information is output to the driver is determined based on the distance between the transmitting vehicle and receiving vehicle, and on an approach speed between the transmitting vehicle and receiving vehicle.

2. The device as claimed in claim 1, wherein a degree of urgency is determined for the outputting of information, based on the distance between the at least one other vehicle and receiving vehicle, and based on the approach speed between the transmitting vehicle and receiving vehicle.

3. The device as claimed in claim 2, wherein the output to the driver includes information about the determined degree of urgency.

4. The device as claimed in claim 3, wherein information about the determined degree of urgency comprises hazard distance information.

5. The device as claimed in claim 2, wherein information about the determined degree of urgency is conveyed to the driver by voice output.

6. The device as claimed in claim 3, wherein the information about the determined degree of urgency is conveyed to the driver by voice output.

7. The device as claimed in claim 4, wherein the information about the determined degree of urgency is conveyed to the driver by voice output.

8. A method for issuing hazard warnings to the driver of a vehicle, comprising:

a receiving vehicle receiving and evaluating hazard data from at least one other vehicle, the received hazard data comprising information regarding position, speed and direction of travel of the at least one other vehicle; and determining an approach speed between the receiving vehicle and the at least one other vehicle in order to evaluate the received data in the receiving vehicle;

in order to evaluate the received data in the receiving vehicle, determining the distance between the at least one other vehicle and the receiving vehicle; and determining whether information is output to the driver, based on the distance between the at least one other vehicle and the receiving vehicle and on an approach speed between the at least one other vehicle and receiving vehicle.

9. The method for issuing warnings of hazards to the driver of a vehicle as claimed in claim 8, wherein a degree of urgency for the outputting of information is determined, based on the distance between the at least one other vehicle and the receiving vehicle and on an approach speed between the at least one other vehicle and receiving vehicle.

10. The method as claimed in claim 9, wherein the output to the driver contains information about the determined degree of urgency.

11. The method as claimed in claim 10, wherein the information about the determined degree of urgency comprises hazard distance information.

12. The method as claimed in claim 9, wherein the information about the determined degree of urgency is conveyed to the driver by voice output.

13. The method as claimed in claim 10, wherein the information about the determined degree of urgency is conveyed to the driver by voice output.

14. The method as claimed in claim 11, wherein information about the determined degree of urgency is conveyed to the driver by voice output.

* * * * *